April 7, 1936.

W. J. MORRILL 2,036,819

DOUBLE VOLTAGE SPLIT PHASE MOTOR

Filed Oct. 11, 1934

Inventor:
Wayne J. Morrill,
by Harry E. Dunham
His Attorney.

Patented Apr. 7, 1936

2,036,819

UNITED STATES PATENT OFFICE 2,036,819

DOUBLE-VOLTAGE SPLIT-PHASE MOTOR

Wayne J. Morrill, Fort Wayne, Ind., assignor to General Electric Company, a corporation of New York Application October 11, 1934, Serial No. 747,847

8 Claims. (Cl. 172—278)

My invention relates to multiple-voltage split-phase motors and its object is to provide a desirable connecting and controlling arrangement which utilizes all of the motor windings and produces the same voltage on the motor coils and on the phase-splitting means for the different voltage connections of the motor. The invention permits of winding the coils of the motor by a coil-winding machine in an economical manner.

In carrying my invention into effect, I divide the motor circuits into at least two groups, each having main and starting windings and phase-splitting means where the latter is not embodied in the motor windings, themselves. The switches for the different motor circuit groups employed for removing or altering the split-phase starting circuit after the motor is started are electrically segregated from each other but may be operated mechanically and simultaneously as a unit. The different motor circuit groups are then connected in parallel or in series for different line voltages as required.

Figure 1:
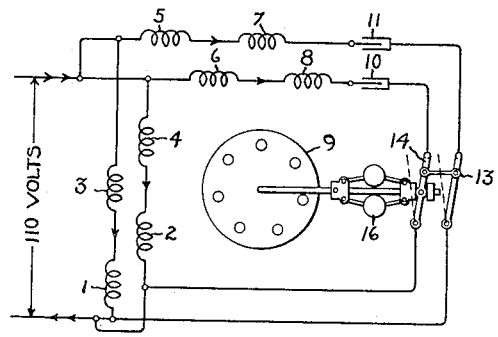
Figure 2:
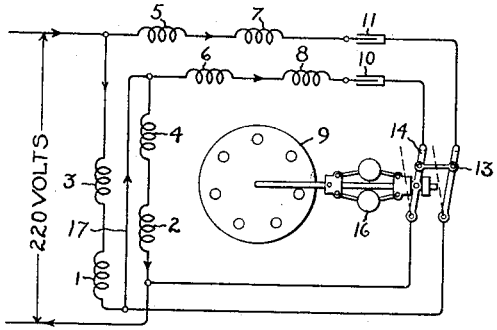
Figure 3:
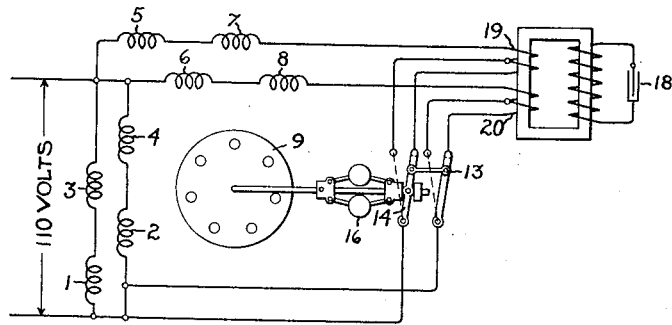
Figure 4:
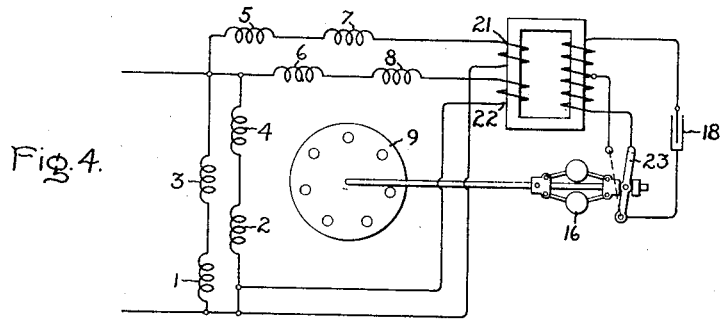

The features of my invention which are believed to be novel and patentable will be pointed out in the claims appended thereto. For a better understanding of my invention, reference is made in the following description to the accompanying drawing wherein Fig. 1 represents a double-voltage split-phase capacitor motor embodying my invention as connected for the lower line voltage; Fig. 2 represents the same motor connected for the higher line voltage; Fig. 3 illustrates how the phase-splitting means may be connected in circuit through a voltage-changing transformer in a motor embodying my invention and also a switching arrangement for changing taps on the transformation ratio between starting and running conditions where that is desirable; and Fig. 4 is a simplified control arrangement for accomplishing the same results as in Fig. 3.

Referring now particularly to Figs. 1 and 2, I have here represented by invention as applied to a four-pole motor having main winding coils 1, 2, 3 and 4 and starting winding coils 5, 6, 7 and 8. The coils 1, 3, 5, and 7 may be considered the main and starting coils for the odd poles and the coils 2, 4, 6, and 8 are then the main and starting coils for the even poles of the motor. Coils 1 and 3 are thus wound and connected in the same direction and may be wound by a single-direction winding machine without breaking the wire connection between them in the winding operation. The same holds true for the other pairs of groups of similarly wound coils, which arrangement thus lends itself to large-volume low-cost production and a minimum amount of connecting up different individual coils by hand to obtain proper connections. It will be understood that the coils which constitute the starting winding will be displaced with respect to the corresponding coils of the main winding by an appropriate angle, usually ninety electrical degrees, and that the phase of the current in the starting winding will be advanced or retarded with respect to the current in the main winding to produce split-phase starting torque on the rotor 9 represented as being of the squirrel cage type. In the present instance, phase modification is obtained by the condensers 10 and 11.

The motor illustrated is for use with either of two line voltages, one double the other, such as 110 and 220 volts. Fig. 1 represents the connection for the lower voltage, and Fig. 2 for the higher voltage. For this purpose, the motor circuits are divided into two similar groups. For the lower voltage, these groups are connected in parallel and, for the higher voltage line connection, these groups are connected in series. It will be noted that, for either line voltage connection, main coils 1 and 3 are connected in parallel with starting winding coils 5 and 7 which are in series with condenser 11 and a switch 13 for cutting out this starting winding circuit as the motor comes up to speed; also, that main winding coils 2 and 4 are connected in parallel with starting winding coils 6 and 8 which are in series with condenser 10 and a switch 14 for the same purpose.

The two switches 13 and 14 may be and are preferably combined mechanically as a single double-pole switch for simultaneous automatic operation as the motor comes up to speed. I have represented a centrifugal device 16 for this purpose with the switch in the starting connection and have indicated in dotted lines that the switch will be open when the motor comes up to speed. The arrangement requires no change in the starting switch when changing from 110 volt to 220 volt line connection. The two group circuits thus formed are similar, i. e., the section of the main winding comprising coils 1 and 3 is electrically similar to the other main winding section comprising coils 2 and 4 so far as resistance, reactance, and number of turns are concerned. Likewise, the section of the starting winding comprising coils 5 and 7 is electrically similar to the remaining starting winding section comprising coils 6 and 8. The phase-modifying means comprising condensers 10 and 11 are also similar. The motor will, therefore, be perfectly balanced electrically for both the 110 volt and 220 volt line connection and the voltages across individual coils, phase-modifying devices, and switch contacts for both group circuits will be exactly the same for both the high and low line voltage connections.

Condensers suitable for the 110 volt line connection may be selected with the assurance that they will be subjected to the same voltage should the motor be connected for a line voltage of 220 volts. The current through the different circuits will be the same for either line voltage connection for the same motor load, although the current taken from the line for the low-voltage connection will be double that for the high-voltage connection. This is indicated by arrowheads in Figs. 1 and 2 which may also be taken to represent the direction of current flow through the motor at a given instant. In Fig. 1, the current flows in parallel in the two parallelly connected group circuits, and, in Fig. 2, it flows in series, the series connection between the two groups being indicated at 17.

If it is desirable to employ a transformer between the starting winding circuit and condenser phase-splitting device, a single condenser 18 may be employed in the manner shown in Fig. 3. Here the transformer has two similar primary coils 19 and 20 connected respectively in series with the odd and even numbered starting winding coils. Fig. 3 also shows an arrangement where the automatic switch reduced the capacitance effect between starting and running connections but leaves the starting winding in circuit during running for power-factor correction. For this purpose, the switch mechanism has an extra set of stationary contacts which are engaged when the motor comes up to speed and these extra contacts are connected to intermediate taps in the primary windings 19 and 20 of the capacitance transformer. The number of primary turns in the transformer is thus reduced as the motor comes up to speed and, since the amount of primary current of the transformer is not materially influenced by this change, the voltage of the secondary and across the condenser 18 is reduced, thereby reducing the capacitance effect in the starting winding circuit.

If desired, the capacitance transformer of Fig. 3 may be controlled as represented in Fig. 4 so as to avoid the use of the double-blade control switch. In Fig. 4, the similar primary windings 21 and 22 of the capacitance transformer are permanently connected in the starting winding circuits. A single-pole double-throw switch 23 is used to change the connections between the secondary winding of the transformer and condenser 18. The switch is represented in the starting position at which time the full voltage of the secondary winding of the transformer is impressed upon the condenser. When the motor comes up to speed, the transformation ratio is reduced as the switch 23 moves to the dotted line position and the capacitance effect in both of the starting winding circuits is similarly reduced. The control switch is thus simplified and, moreover, is completely electrically segregated from line voltages and the motor starting winding circuits are not interrupted when the switch operates.

The phase-modifying means of both the group circuits are similar and they are similarly and simultaneously altered between starting and running conditions.

The invention is not limited to any particular pole number motor. The phase-altering characteristics between the main and starting winding circuits may be incorporated in the windings, themselves, as it is not necessary to use a capacitance phase split and the invention is equally applicable irrespective of whether or not the starting winding is used after the motor comes up to speed.

What I claim as new and desire to secure by Letters Patent of the United States, is:—

1. A double-voltage split-phase motor having a primary winding consisting of displaced main and starting windings, each of which is divided into two electrically similar sections, a section of the main winding and a section of the starting winding being connected in parallel circuits to form a group and the remaining sections of the main and starting windings being connected in parallel circuits to form a second group, and means for connecting said two groups in parallel or in series for operation of the motor at different line voltages with the same relative direction of current flow in all of the winding sections for both connections.

2. A multiple-voltage split-phase motor having a primary winding consisting of displaced main and starting windings, each of which is divided into electrically similar sections, means for connecting individual sections of the main and starting windings in parallel circuits to form as many groups as there are similar sections in each winding, means for connecting said groups in series or in parallel for operation of the motor at different line voltages with the same relative direction of current flow in all of the winding sections for both connections, and means for similarly altering the starting winding circuit of each such group as the motor comes up to speed following a starting operation.

3. A Split-phase motor having displaced main and starting windings, each of which is divided into a pair of electrically similar sections, means for connecting a section of each of said windings in parallel circuits to form a group, means for connecting the remaining sections in a similar group, means for connecting said groups in series or in parallel, so that the relative direction of current flow in all winding sections of the motor will remain the same for both of said connections, similar phase-modifying devices included in the starting winding circuit of each such group, and means for simultaneously opening said starting winding circuits.

4. A double-voltage split-phase condenser motor having displaced main and starting windings, each of which is divided into two electrically similar sections, means for connecting one such section of the main winding and one such section of the starting winding in parallel circuits to form a group, means for similarly connecting the remaining sections of the main and starting windings in parallel circuits to form a second group, similar condensers included in the starting winding circuit of each group, means for simultaneously opening the starting winding circuit of each group, and means for connecting said group in series or in multiple for operation of the motor at different voltages without changing the relative direction of current flow through the different winding sections of the motor.

5. A double-voltage split-phase condenser motor having displaced main and starting windings, each of which is divided into two electrically similar sections, means for connecting one section from each winding in parallel circuits to form a group, means for similarly connecting the remaining sections from each winding to form a second group, similar capacitance means included in the started winding circuit of each group, means for simultaneously and similarly modifying the effect of such capacitance means in each starting winding circuit between starting and running conditions of the motor, and means independent of said last mentioned capacitance-modifying means for connecting said groups in series or in parallel for operation of said motor from different voltage power circuits.

6. A double-voltage split-phase motor having displaced main and starting windings, each of which is divided into two electrically similar sections, means for connecting one section from each winding in parallel circuits to form a group, means for similarly connecting the remaining winding sections in parallel circuits to form a second group, a transformer having two similar primary windings, one being connected in the starting winding circuit of one of said groups and the other primary winding being similarly connected in the starting winding circuit of the other of said groups, a secondary winding for said transformer, a condenser connected across said secondary winding, means for simultaneously and similarly altering the transformation ratio existing between said two primary windings and said condenser, and means independent of said last mentioned means for connecting said groups in series or in parallel with the relative direction of current flow in the different winding sections of said motor and transformer remaining the same for all connections.

7. A double-voltage split-phase motor having displaced main and starting windings, each divided into two electrically similar sections, means for connecting one section from each of the main and starting windings in parallel circuits to form a group, means for similarly connecting the remaining sections of the main and starting windings in parallel to form a second group, means for causing currents flowing through the parallel circuits of each group to have different phase relations, means for altering the starting winding circuit of each group between starting and running conditions of the motor, and means independent of said means for altering the starting winding circuit for connecting said groups in parallel for operation of the motor at one line voltage and for connecting them in series for operation of the motor at double said first mentioned line voltage.

8. A split-phase motor having a plurality of pairs of poles, each pole having a main and starting winding coil, the coils of the main winding for odd poles being connected in series, the coils of the starting winding for odd poles being connected in series and the two series sections thus formed being connected in parallel circuits to form a group, means for similarly connecting the coils of the main and starting windings for even poles in a similar group, and means for connecting said group in series or in parallel for operation of the motor at different line voltages, with the relative magnitude, direction and place relation of the currents in the different winding coils of the motor remaining the same for all of said connections.

WAYNE J. MORRILL.

CERTIFICATE OF CORRECTION.

Patent No. 2,036,819.

April 7, 1936.

WAYNE J. MORRILL.

It is hereby certified that error appears in the printed specification of the above numbered patent requiring correction as follows: Page 1, first column, line 44, for the word "by" read my; page 3, first column, line 9, claim 5, for "started" read starting; and second column, line 36, claim 8, for "place" read phase; and that the said Letters Patent should be read with these corrections therein that the same may conform to the record of the case in the Patent Office.

Signed and sealed this 19th day of May, A. D. 1936.

Leslie Frazer

Acting Commissioner of Patents.

(Seal)